US006504836B1

(12) United States Patent
Li et al.

(10) Patent No.: US 6,504,836 B1
(45) Date of Patent: Jan. 7, 2003

(54) COMMUNICATION SYSTEM

(75) Inventors: Hui Li, Nürnberg (DE); Gregor Bautz, Hässelby (SE); Jamshid Khun-Jush; Jörn Thielecke, both of Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/178,549

(22) Filed: Oct. 26, 1998

(30) Foreign Application Priority Data

Oct. 27, 1997 (DE) ......................................... 197 47 398

(51) Int. Cl.⁷ ................................................. H04J 3/24
(52) U.S. Cl. ..................... 370/349; 370/347; 370/395.1
(58) Field of Search ............................... 370/349, 395.1, 370/396, 397, 409, 389, 465, 468, 470, 471, 473, 474, 337, 347, 229, 231, 399, 395.3, 232

(56) References Cited

U.S. PATENT DOCUMENTS

| 5,638,371 | A | * | 6/1997 | Raychaudhuri et al. | 370/347 |
| 5,684,791 | A | * | 11/1997 | Raychaudhuri et al. | 370/278 |
| 5,717,689 | A | * | 2/1998 | Ayanoglu | 370/349 |
| 5,953,328 | A | * | 9/1999 | Kim et al. | 370/337 |
| 6,052,594 | A | * | 4/2000 | Chuang et al. | 455/450 |
| 6,064,649 | A | * | 5/2000 | Johnston | 370/232 |
| 6,075,787 | A | * | 6/2000 | Bobeck et al. | 370/395 |
| 6,198,728 | B1 | * | 3/2001 | Hulyalkar et al. | 370/252 |

FOREIGN PATENT DOCUMENTS

| DE | 19533507 A1 | 3/1997 |
| EP | 0687078 A2 | 6/1995 |
| EP | 0681406 A1 | 11/1995 |
| EP | 0 755 164 A2 | 1/1997 |

OTHER PUBLICATIONS

International Search Report dated Jul. 14, 1999.
B. Walke, et al.: "Wireless ATM: Air Interface and Network Protocols of the Mobile Broadband System"; IEEE Personal Communications, Aug. 8, 1996, pp. 50–56, vol. 3, No. 4, XP000623675.
G. Benelli et al.: "Error Recovery for ATM Transmission Over Wireless Channels"; Electronics Letters, Aug. 3, 1995, pp. 1325–1326, vol. 31, No. 16, XP000524962.
D. Moore et al.: "Variable Rate Error Control for Wireless ATM Networks" Communications—Gateway to Globalization Proceedings of the Conference on Communications, Seattle, Jun. 18–22, 1995, Jun. 18, 1995, pp. 988–992, vol. 2, Institute of Electrical and Electronics Engineers isbn: 0–7803–2787–0.

(List continued on next page.)

Primary Examiner—Douglas Olms
Assistant Examiner—Brian Nguyen (57) ABSTRACT

Communication system for transmitting data packets via a plurality of virtual wireless communication links established between a base station and a plurality of operable mobile stations, the communication links having a variable transmission capacity and wherein messages for a requirement-oriented data transmission are transmitted on a plurality of communication links or channels within three types of control data packets. Said control data packets contain messages grouped according to their importance, allowing an efficient error treatment. The partitioning of messages into groups further allows an increase of the flexibility and efficiency of a data transmission, since only necessary control information is transmitted a direct decoding of received control data packets becomes possible without a detour via a higher level of a used communication model.

28 Claims, 5 Drawing Sheets

OTHER PUBLICATIONS

"Design Principles for a MAC Protocol of an ATM Air Interface", D. Petras, A. Kramling and A. Hettich, Mobile Telecommunications Summit, Granada, Spain, Nov. 27–29, 1996.

"MASCARA, a MAC Protocol for Wireless ATM", ACTS Mobile Communications, Granada, Spain, Nov. 1996, pp. 647–651, F. Bauchot, S. Decrauzat, G. Marmigere, L. Merakos and N. Passa.

* cited by examiner

COMMUNICATION SYSTEM

FIELD OF INVENTION

The present invention relates to a communication system and in particular, the present invention relates to a communication system for transmitting data packets via a plurality of virtual wireless communication links established between a base station and a plurality of operational mobile stations and having a variable transmission capacity.

BACKGROUND OF THE INVENTION

Wireless communication networks for transmitting data and audio information are increasingly in use. Wireless communication networks are able to serve mobile stations as well as fixedly located end stations. A data transmission in such networks is often performed using multiplex techniques, where a plurality of communication links is transmitted via a single transmission channel. Such a transmission channel may, e.g. be a radio frequency band. Examples for wireless communication networks are mobile communication networks, e.g. networks according to the GSM-standard.

In communication networks employing multiplex techniques individual radio channels are partitioned into a plurality of time frames, itself each partitioned into a plurality of time slots. Each of these time slots can now be used for transmitting data for one communication link in that a sending station places data to be transmitted via one of the communication links onto particular time slots of the time frame. At a receiving station, it is known, which time slots are used for transmitting data intended for the receiving station and thus all data transmitted via the communication link can be recovered at the receiving station. For example, the receiving station combines the short data segments transmitted on the time slots to a continuous audio signal.

In general, different techniques may be employed to transmit data of a plurality of communication links via a common medium. It is a widely used method to employ a fixed assignment of time slots of a transmission frame to communication links. Such a fixed assignment, for example, is generally in use in GSM-systems.

If it is assumed that for example data of four communication links are to be transmitted via a common medium, each of the transmission frames of the medium could be divided into four time slots, and a first communication link could be established via the first time slot of each transmission frame, a second communication link could be established via the second time slot and analogously, the other communication links could be established via the third and fourth time slots.

Thus, the transmission medium is made available to each of the communication links at a fixed point in time. A fixed assignment of time slots to communication links thus allocates a predetermined and fixed capacity to each of the communication links. In general therefore the same channel capacity is made available to a communication link, which is used for the transmission of speech signals and accompanying speech pauses, as it is made available to a communication link used for the transmission of data, e.g. between two computers. However, in order to enable an efficient usage of a communication system it is desirable to adapt the capacity assigned to a communication link to the actual requirements of the amount of data to be transmitted.

A second generally used method for assigning of time slots to communication links enables an adaptation to the capacity requirements of a communication link. Here, a repetitive and fixed assignment of time slots of a communication channel to communication links it is not performed any longer, the assignment is performed dynamically corresponding to the amount of data to be transmitted.

One of the connection-oriented multiplex switching techniques is ATM (Asynchronous Transfer Mode). In ATM data belonging to a communication link are not necessarily transmitted periodically on a transmission medium and it becomes possible to allocate transmission bandwidth for subscribers as required, without encountering problems, if one of the subscribers requests to use a large bandwidth. ATM combines advantages of packet-switched networks and line-switched networks.

ATM covers layer 1 and large parts of layer 2 of the ISO-OSI-reference model. The OSI-reference model of the ISO (International Standardization Organization) describes a protocol layering for a communication between open systems, i.e. systems not in accordance with a standard, and distributed systems. Layer 1 of the OSI-reference model is the physical layer, layer 2 is the link layer.

In an ATM transmission so-called message cells of a predetermined length are transmitted as transmission units, using address information contained in a header. In general, ATM cells contain messages concerning the virtual connection, i.e. the communication link, as well as information concerning virtual communication channels, wherein a communication link may be divided into a plurality of virtual channels. Corresponding to the amounts of data individual channels may occupy more or less time slots.

A communication-oriented transmission of data via virtual communication links has been to date used particularly in communication networks with fixed lines, as for example in LANs (Local Area Networks).

It is, however, desirable to apply the advantages of a requirement-oriented data transmission to wireless communication networks. But in this endeavor it shows that data rates and bit error rates in communication networks with fixed lines and requirement-oriented transmission, e.g., a switching based on ATM, do not allow to readily use these techniques in wireless communication networks. For example, ATM for a data transmission in fixed networks provides a typical data and bit error rate of 155 Mbit/s and 10e-14, respectively. For providing the services of fixed networks with variable communication link capacity in mobile communication networks, an adaptation to a low channel capacity (25 Mbit/s) and a high bit error rate (10e-2) for radio channels (25 MHz channels in the 5 MHz range) is required.

Rules for an adaptation of connection-oriented switching techniques are, e.g. specified in the MAC (Medium Access Control) protocol. The MAC-protocol occupies a sub-layer of the layer 2 of the OSI-reference model.

The MAC-protocol consists of a number of messages, which are transmitted between mobile stations and a base station and determine the usage of the transmission medium. The MAC-protocol enables to establish a plurality of virtual communication links with communication-oriented transmission capacity using multiplex techniques. A MAC-protocol in general consists of different protocol data units for transmitting the above messages. Therefore, the efficiency and flexibility of a MAC-protocol is closely linked with the definition of different types of protocol data units (PDU).

A definition of protocol data units for a wireless requirement-oriented ATM communication is, e.g. known from "Design Principles for a MAC-protocol of an ATM air interface", D. Petras, A. Krämling, A. Hettich, Mobile Telecommunications Summit, Granada, Spain, Nov. 27–29, 1996. In this document four types of protocol data units are described, transmitted in a transmission frame divided into an uplink and a downlink transmission portion. Here, in a uplink transmission portion data are transmitted from a mobile station to a base station and in a downlink transmission portion data are transmitted from a base station to a mobile station.

A Sig-PDU for uplink transmission contains a reservation message for a following transmission frame and further control information, e.g. for controlling access to time slots reserved for a transmission from an arbitrary mobile station.

A ATM-cell-PDU for downlink transmission contains an ATM-cell having a LLC (Logic Link Control) header with an overall length of 55 Byte.

A Sig-PDU, used for uplink transmission, contains, e.g., a capacity request or acknowledgments having a length of roughly 3 Byte.

A ATM-cell-PDU, used in uplink portions of the transmission frame contains an ATM-cell, a LLC (Logic Link Control) header and a capacity request message having an overall length of 57 Byte.

This partitioning of messages of the MAC (Medium Access Control)-protocol in four protocol data units, however, is disadvantageous, since the data transmission is not efficient. If n-ATM-cells of payload data are to be sequentially transmitted to a mobile station, control information is transmitted n-times, because it is part of each ATM-cell-PDU. It is sufficient, however, to transmit this control information a single time at the beginning of the n-ATM-cells. Furthermore, a UpATM-cell-PDU typically contains messages of varying importance and thus of varying sensitivity to errors. It is therefore difficult to provide efficient measures for error correction.

Further, a MAC-protocol with the name MASCARA is known from "MASCARA, a MAC-protocol for wireless ATM," ACTS Mobile Communications, Granada, Spain, November 1996, pp. 647–651, F. Bauchot, S. Decrauzat, G. Marmigere, L. Merakos and N. Passas. The MASCARA-protocol defines the concept of a cell sequence, wherein a succession of ATM-cells is transmitted, which belong to the same virtual connection, and are transmitted as payload of a MAC-PDU (MPDU). Each MPDU comprises a MPDU-header, followed by a MPDU-body portion. Even though the MASCARA-protocol avoids various disadvantages of the above-mentioned MAC-protocol based on four types of PDUs, the MASCARA-protocol does not provide the needed flexibility to transmit short messages necessary for organizing data transmission.

SUMMARY OF THE INVENTION

It is therefore object of the invention, to provide a communication system enabling an efficient requirement-oriented data transmission.

This object is solved by a communication system for transmitting a plurality of payload data packets, comprising: a base station (B), a plurality of operable mobile stations (M1–Mn), communication links (C1–Cm) with variable transmission capacity, established between the base station (B) and the plurality of operable mobile stations (M1–Mn), each of the communication links occupying time slots of a radio channel for a data transmission, control data packets of a first type (S1), each of which being transmitted from the base station (B) via each of the virtual connections (C1–Cm) to each of the plurality of operable mobile stations (M1–Mn) and at least containing information on the partitioning of the radio channel into time slots, control data packets of a second type (S21–S24), each of which being transmitted via one of the virtual connections (C1–Cn), for controlling the virtual connection, and control data packets of a third type (S3), each of which being transmitted via one of the virtual connections (C1–Cm) and containing at least one payload data packet.

The object of the invention is further solved by a communication system for transmitting a plurality of payload data packets, comprising: a base station (B), a plurality of operable mobile stations (M1–Mn), communication links (C1–Cm) with variable transmission capacity, established between the base station (B) and the plurality of operable mobile stations (M1–Mn), each of the communication links occupying time slots of a radio channel for a data transmission, control data packets of a first type (S1), each of which being transmitted from the base station (B) via each of the virtual connections (C1–Cm) to each of the plurality of operable mobile stations (M1–Mn) and at least containing information on the partitioning of the radio channel into time slots, control data packets of a second type (S21–S24), each of which being transmitted via one of the virtual connections (C1–Cn), for controlling the virtual connection, control data packets of a third type (S3), each of which being transmitted via one of the virtual connections (C1–Cm) and containing at least one payload data packet, and forward error control signals transmitted in association with at least one of the control data packets, with a forward error control signal for a control data packet of the first type (S1) exhibiting a redundancy equal or larger than the redundancy of a forward error control signal for a control data packet of the second type (S21–S24), and a forward error control signal for a control data packet of the second type (S21–S24) exhibiting a redundancy equal or larger than the redundancy of a forward error control signal for a control data packet of the third type (S3).

Still further, the object of the invention is solved by a communication system for transmitting a plurality of payload data packets, comprising: a base station (B), a plurality of operable mobile stations (M1–Mn), communication links (C1–Cm), each divided into a plurality of channels, with variable transmission capacity, established between the base station (B) and the plurality of operable mobile stations (M1–Mn), each of the communication links occupying time slots of a radio channel for a data transmission, control data packets of a first type (Si), each of which being transmitted from the base station (B) via each of the virtual connections (C1–Cm) to each of the plurality of operable mobile stations (M1–Mn) and at least containing information on the partitioning of the radio channel into time slots, control data packets of a second type (S21–S24), each of which being transmitted via one of the virtual connections (C1–Cn), for controlling the virtual channels, and control data packets of a third type (S3), each of which being transmitted via one of the virtual connections (C1–Cm) and containing at least one payload data packet.

The invention advantageously provides several types of control data packets, which are transmitted between a base station and a plurality of operable mobile stations via virtual communication links having a variable transmission capacity.

Advantageously, the types of control data packets are designed to contain messages necessary for a requirement-oriented transmission of data, the messages being sorted according to their type and importance. Thus, error correcting means may be provided for the respective control data packets with varying importance, the error correcting means taking into account said importance. The introduction of error correcting means allows a very efficient forward error control already on the lowest, physical layer of a transmission medium.

Further, an adapted transmission capacity may advantageously be assigned for the transmission of control data packets according to the importance of their contents. Therefore, transmission capacity may be preferred assigned to control data packets of the first type and control data packets of the second type.

By choosing the contents of the control data packets, a high transmission efficiency with a small overhead is advantageously achieved. Further, the choice of the contents of the control data packets and their lengths allows a high flexibility and efficiency in transmitting information for controlling the virtual communication links.

Advantageously, control data packets of the second type may contain different kinds of control information for controlling a virtual communication link or a virtual communication channel, respectively. Thus, control data packets may be kept short for a higher flexibility and efficiency of the system. Time slots for the transmission of data via a virtual connection may be reserved or indicated by a time slot reservation signal in a control data packet of the second type. Further, signals for establishing a communication via the virtual link and/or signals for maintaining a communication link may be comprised therein. Further, a control data packet of the second type may contain an error control signal, which may be used for signaling the correctness or incorrectness of payload data packets transmitted via the virtual link.

In a further advantageous embodiment forward error control signals are transmitted at least for one type of control data packets. A forward error control signal for a control data packet of the first type advantageously exhibits a larger redundancy than a forward error control signal for a control data packet of the second type, and moreover, a forward error control signal for a control data packet of the second type exhibits a larger redundancy than a forward error control signal for a control data packet of the third type. Thus, the importance of the different kinds of control data packets may also be efficiently addressed via an error control.

Advantageously, the length of a control data packet of the third type may be an integer multiple of the length of a control data packet of the second type, thus further increasing transmission efficiency.

Further, with the definition of the kinds of control data packets and their structure, an analysis of control data packets may advantageously be performed directly, without awaiting an acknowledgment from a higher layer of a used communication model.

In a further advantageous embodiment of the invention, a data transmission in the communication system may be performed corresponding to the OSI-reference model. Further, control data packets may contain MAC-protocol data units and the data transmission may be performed via ATM.

Further advantageous embodiments become obvious with further dependent claims.

BRIEF DESCRIPTION OF THE FIGURES

The present invention may be best understood in connection with the accompanying drawings, in which.

DETAILED DESCRIPTION OF EMBODIMENTS

In the following an embodiment of the present invention is described with respect to FIG. 1.

Figure 1:
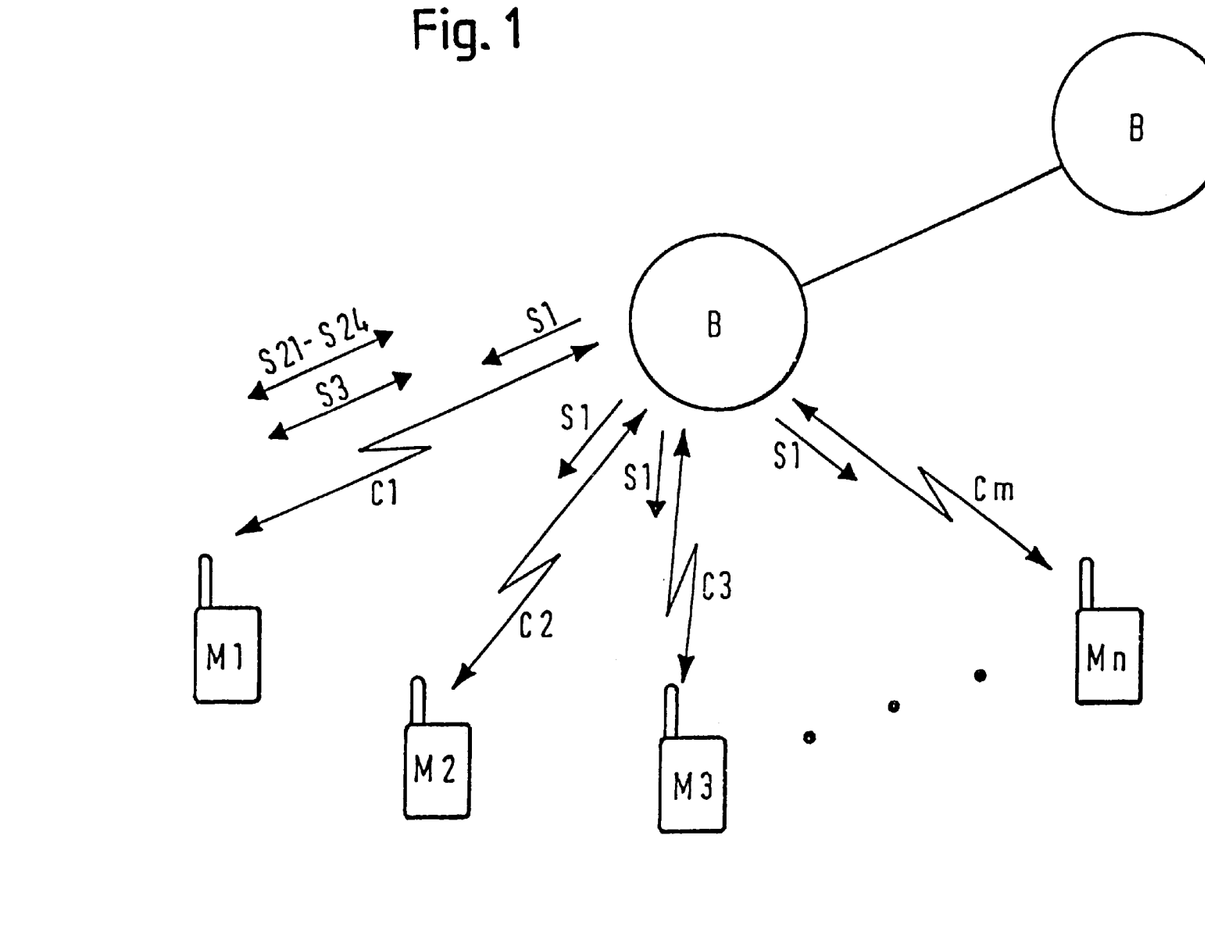
FIG. 1 schematically shows an embodiment of the communication system according to the invention.

FIG. 1 illustrates the inventive communication system, comprising two base stations B as well as. a plurality of mobile stations M1–Mn. Virtual communication links C1–Cm are established between one of the base stations B and the mobile stations M1–Mn. Each mobile station may maintain one or a plurality of communication links to the base station.

Even though FIG. 1 displays only two base stations B, the inventive communication system preferably comprises a plurality of base stations, each connected with a plurality of mobile stations, as well as further transmission units.

In the embodiment of FIG. 1 it is assumed that said communication links C1–Cm are established in a single frequency band using multiplex techniques. The communication system preferably uses, even though only one is illustrated, a plurality of frequency bands, each used for serving a group of mobile telephones in multiplex operation.

As outlined in the introductory portion, the inventive communication system provides a requirement-oriented communication link capacity for each respective mobile station, i.e., as much bandwidth of the transmission medium as it is needed for the transmission of data is allocated to a respective communication link. For this requirement-oriented switching a data transmission frame in the frequency band is divided into a plurality of time slots, and each time slot may be used as required by one of the mobile stations for a data transmission via the corresponding virtual communication link.

A requirement-oriented switching needs a various control messages for controlling a dynamic allocation of time slots to respective mobile telephones and virtual communication links, respectively. Said control of the data transmission firstly requires control instructions regarding the partitioning of one transmission frame into time slots. This may, for example, incorporate an exact assignment of begin and end timings for time slots and a definition, which of the time slots are used for a transmission of data from mobile stations M1–Mn to the base station B, and which of the time slots are used for a transmission of information from the base station B to the mobile stations M1–Mn.

Therefore, a control data packet of a first type S1 is provided, which is transmitted from the base station B via each of the virtual links C1–Cm to each of the plurality of operable mobile stations M1–Mn. This control data packet of the first type S1 contains at least information or messages concerning the partitioning of the transmission medium into time slots and must be received and analyzed by each of the operable mobile stations, for defining a basic structure for a data transmission.

Further, for a carrying out a requirement-oriented data transmission, control information is necessary, which is transmitted between the base station and a respective one of the mobile stations M1–Mn. These messages may, for example, be control instructions for controlling the communication link between the base station and the corresponding mobile station, or may contain reservation requests regarding time slots from one of the mobile stations M1–Mn.

Therefore, control data packets of a second type S21–S24 are provided, each of which being transmitted via one of the virtual links C1–Cm, for controlling the corresponding virtual connection.

Further, payload data packets are to be transmitted via the virtual link, e.g., to transmit speech signals. Therefore, control data packets of a third type S3 are defined, each of which is transmitted via one of the virtual connections C1–Cm and containing at least one payload data packet.

In further embodiments it is possible, that at least one communication links C1–Cm is divided into a plurality of channels. The plurality of channels may, e.g., be used for a transmission of payload data to the corresponding mobile station regarding different intended purposes. Thus, e.g., audio data may be transmitted on one channel and video data on another channel. In this case, control data packets may be transmitted independently from each other on each channel, i.e. control data packets of the second type S21–S24 and control data packets of the third type S3 are transmitted via each respective channel.

With the above partitioning of messages for a connection-oriented communication, the most important messages for the communication are mainly transmitted in control data packets of the first type S1. Control information for controlling a virtual connection C1–Cm between the base station B and one of the mobile stations M1–Mn is of lesser importance, since it concerns only one single mobile station M1–Mn and this kind of control information is transmitted in control data packets of the second type S21–S24. In view of maintaining a data communication within the communication system payload data packets are information of least important and are transmitted in control data packets of the third type S3.

The concept of grouping messages according to importance and the transmission of messages of a particular importance level with control data packets of a corresponding type advantageously allows to provide measures to secure a correct reception of transmitted information according to importance.

Obviously, information concerning the basic structuring of the transmission medium is of highest importance, without the availability of this information a data transmission between the base station B and one of the mobile stations M1–Mn cannot be carried out. Therefore, in a further embodiment of the invention a forward error control signal may be transmitted in association with a control data packet of the first type S1, enabling the receiving station, i.e., of the mobile stations M1–Mn, to correct transmission errors. Preferably a forward error control signal is transmitted in association with a control data packet of the first type S1, which provides a large redundancy with respect to the transmitted data, in order to allow possibly needed error corrections with highest probability.

Control data packets of the second type S21–S24 serve, as mentioned above, for establishing a data communication link or for a maintenance of a connection between the base station B and the mobile stations M1–Mn. Since an undisturbed connection is desirable, for these control data packets of the second type S21–S24 advantageously forward error control signals may be transmitted for enabling an error correction for these control data packets, too. Since, as outlined above, the importance of control data packets of the second type S21–S24 is of lesser importance for maintaining a data transmission in the communication system then control data packets of the first type S1, lower demands are made on the forward error control signal. Thus, in association with a control data packet of the second type S21–S24 a forward error control signal may be transmitted, which exhibits a lower redundancy than a forward error control signal for a control data packet of the first type S1.

Control data packets of the third type S3 are of least importance for carrying out a data transmission in the communication system, such that a forward error control signal may be provided for these control data packets exhibiting a comparatively lower redundancy than the forward error control signals for the control data packets of the first type S1 and the control data packets of the second type S21–S24.

Thus, specifically tailored mechanisms for a forward error control may be provided for each control data packet, taking into account the importance of the information contained in the respective control data packets.

Preferably a forward error control signal is provided for each control data packet, however, it is possible, that control data packets are not for provided for all types S1; S21–S24; S3, in order to increase the transmission efficiency of the communication system.

It is also preferred, that the provision of forward error control signals takes into account expected error rates of the communication links, i.e. for a communication link with a lower error rate, a redundancy of the forward error control signals may be reduced correspondingly, i.e., the ability for correcting of transmission errors is adapted to the transmission quality of the transmission medium, thus optimizing the efficiency of the transmission system.

In a further embodiment of the invention, data transmission in the communication system may be performed on the basis of ATM (Asynchronous Transfer Mode). Further, data transmission may be performed according to the OSI-reference model. As outlined in the introductory portion, ATM covers in the OSI-reference model at least parts of the link layer and the physical layer. In this case, said control data packets are protocol data units PDU as already described in the introductory portion. With the three types of protocol data units, a flexible and efficient MAC-protocol may be defined.

With the above-described concept of a division of messages for maintaining a connection-oriented communication, the forward error control may be already performed on the physical layer of the OSI-reference model. This allows a significant increase of efficiency.

Further, the choice of contents of control data packets provides a high transmission efficiency via a low overhead in each of the control data packets. Moreover, said short control data packets of the second type S21–S24 with possibly different contents allow a flexible and efficient transmission of control data.

In the following, with respect to FIGS. 2A–2C further embodiments of the inventive communication system are described.

Figure 2A:
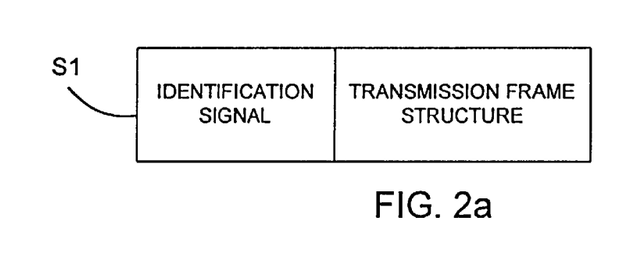
FIGS. 2A to 2C show embodiments of contents of control data packets of the first, second and third type.
Figure 2B:
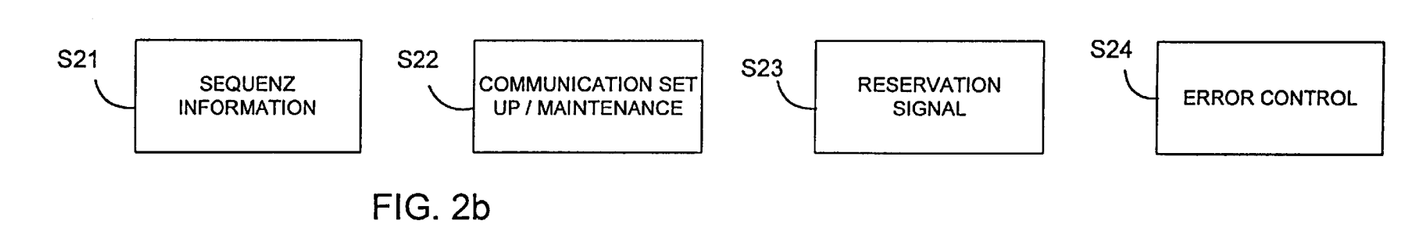
Figure 2C:
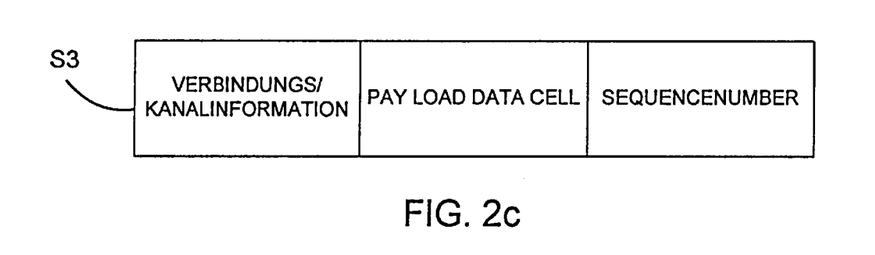

FIGS. 2A–2C show embodiments of control data packets of the first, second and third type S1; S21–S24; S3. As already outlined with respect to FIG. 1, said control data packets contain messages needed for performing a requirement-oriented communication in the communication system. In the following, a preferred embodiment for dividing these messages into groups is described.

The following six groups are defined:

1) Messages concerning the basic structure of a transmission frame for establishing a plurality of communication links C1–Cm and/or channels in a frequency band using multiplex techniques with a plurality of time slots. These messages must be transmitted from the base station to each operable mobile station M1–Mn at the beginning of each transmission. Each operable mobile station must receive and analyze these messages, since without knowing the structure of the transmission frame, a controlled data transmission between the base station and the mobile telephones is impossible. It is obvious, that these messages are of highest importance and in this sense are very sensitive to transmission errors. Therefore, in association with messages of this kind preferably data for a forward error control are transmitted, enabling the receiving station to correct errors. It is preferred that the signal for a forward error control provides a particularly good basis for an error control.

2) The second group of messages are header messages, identifying the virtual communication links C1–Cm. In case that the virtual communication links are divided into a plurality of virtual channels, the virtual channels may also be identified in the header message. If the messages of this group are transmitted from one of the operable mobile stations M1–Mn to the base station B, messages of this group may also contain an identification signal of the base station. Thus it can be assured, if a plurality of base stations are located in the reception area of the signal from the mobile station, that the base station corresponding to the virtual communication link can be selected. Further, messages of this group may contain identification signals for mobile stations M1–Mn, assuring that these messages are only transmitted via one virtual communication link/channel to a corresponding mobile station. Preferably these messages may be sent at the beginning of control data packets, for identifying sender and receiver. These messages may also be transmitted at the beginning of a whole sequence of control data packets, such that only once sender and receiver are to be defined. This may be used in increasing the efficiency of a communication in the communication system.

3) The third group of messages for a requirement-oriented communication are messages, which control a virtual communication link/channel. Messages of this group are used for preparing a communication link/channel for a data transmission between an operable mobile station M1–Mn and the base station B, and may be used in maintaining a communication link/channel. It is preferred that messages of this group are transmitted only via one virtual communication link/channel between the base station and a corresponding mobile station.

4) The fourth group of messages for a requirement-oriented communication are messages containing reservation requests of mobile stations M1–Mn. These messages are normally transmitted from a mobile station to the base station B and contain a request for reserving certain time slots within a transmission frame for the corresponding mobile station. Specific time slots may be provided in a transmission frame for messages of this group, preferably via messages of group 1).

5) The fifth group of messages for a requirement-oriented communication are error control messages. These messages are provided for controlling a reliable data transmission. Preferable they are transmitted between the base station B and a mobile station M1–Mn. With these messages, for example, the correctness or incorrectness of a data reception may be signaled. This allows, for example, that a receiving station erases data stored for security reasons, and for initiating a retransmission of data, respectively.

6) The sixth group of messages for a requirement-oriented communication contain payload data packets.

As already outlined above, messages of group 1) are particularly sensitive to errors, whereas messages of group 2) to 5) exhibit a medium sensitivity to errors and messages of group 6) exhibit the least sensitivity to errors. It is therefore preferred that messages of the respective groups 1)–6) are transmitted with different options for error control.

In the following, an embodiment of such a division of messages into control data packets of the first, second and third type S1; S21–S24; S3 will be described with respect to FIGS. 2A–2C.

Initially, an embodiment of control data packet of the first type S1 will be described with respect to FIG. 2A.

Control data packets of the first type Si are transmitted from the base station via all virtual communication links to each operable mobile station M1–Mn and contain a basic structuring of the transmission frame. Therefore, a control data packet of the first type S1 mainly contains messages for carrying out a communication-oriented communication of group 1). A control data packet of the first type S1 can e.g., be used for partitioning a transmission frame into time slots for a downlink transmission from the base station to the mobile stations and into time slots for an uplink transmission from the mobile station to the base station. Furthermore, a control data packet of the first type S1 contains an identification signal for identifying the base station B or a mobile station M1–Mn, respectively. The identification signal may be used for notifying the operable mobile stations M1–Mn, that virtual communication links are to be established to this base station B. Besides the signals shown in FIG. 2a, a check sum may be transmitted with a control data packet of the first type S1 for performing an error detection.

In further embodiments, in case the inventive communication system transmits data using ATM, a control data packet of the first type S1 may in particular contain messages concerning the MAC-frame structure.

In the following, possible contents of a control data packet of the second type S21–S24 are described with respect to FIG. 2b.

Control data packets of the second type preferably have a constant length, however, they may contain different messages. As outlined above, control data packets of the second type S21–S24 contain control information regarding a particular virtual communication link C1–Cm or a particular communication channel. The control data packets of the second type S21–S24 preferably all have the same length, and may be transmitted, as required, individually or in sequence. In the embodiment of FIG. 2b, four types of control data packets of the second type are defined, being header control data packets S21, link control data packets S22, reservation control data packets S23 and error control data packets S24. A header control data packet S21 may at least include sequence information, for indicating a sequence of control data packets to be transmitted. A header control data packet S21 therefore may predominantly contain messages for carrying out a requirement-oriented communication of group 2). At the beginning of a sequence of control data packets, information regarding sender and receiver may be transmitted once using a header control data packet S21, so that this information is not required for following control data packets.

Link control data packets S22 may at least contain messages for establishing a payload data communication via a communication connection or channel and may contain messages for maintaining said connection or channel. A transmission of payload data may be set up using these messages and a communication connection or channel may be maintained, respectively. Link control data packets S22 may mainly contain messages of group 3).

In case the communication system transmits data according to ATM, messages concerning the MAC/LLC-layer (medium access control/logic link control) may be transmitted.

Reservation control data packets S23 may at least contain reservation signals, used by the mobile stations M1–Mn for reserving time slots. These control data packets are normally transmitted via the uplink from one mobile station to the base station B. Reservation control data packets S23 may in particular contain messages of group 4).

In case, a data transmission is carried out according to the ATM-method, dedicated time slots in the MAC-transmission frame may be reserved for these control data packets.

Error control data packets S24 may at least contain error control signals, for controlling and securing a reliable data transmission. Advantageously, messages of group 5) may be included in error control data packets. It is possible, to perform an adapted error control for the control data packets using the error control data packets, preferably by considering control data packets corresponding to importance.

In the following, control data packets of the third type S3 will be described with respect to FIG. 2c.

Said control data packets each contain a payload data cell, used for actual data transmission. In addition to the payload data cell control, data packets of this type contain messages concerning the corresponding communication link or the communication channels associated with the communication link.

In case the communication system performs a data transmission according to ATM, the payload data cells are ATM-cells. Accordingly, control data packets of the third type S3 preferably contain messages of the groups 6) and 2). The control data packets may also contain a sequence number, for indicating a sequence of payload data packets. A sequence number, in case of the ATM-method a ARQ-number, supports the receiving station in establishing the correct sequence of payload data packets.

As already outlined with respect to control data packets of the first type S1, all other control data packets may also contain a check sum, for performing an error detection. In case of ATM this may be a CRC check sum.

It is pointed out that the embodiments of control data packets only constitute examples, the control data packets do not necessarily have to contain the indicated messages or may contain additional messages.

By grouping the messages for carrying out a requirement-oriented wireless communication using multiplex methods in accordance with importance and by transmitting said grouped messages in control data packets of the first, second or third type S1; S21–S24; S3, an adapted forward error control may already be performed on the physical layer. That is, forward error control signals may be transmitted in association with said control data packets, the forward error control signals having a redundancy corresponding to the importance of the respective control data packet.

The exactly defined contents of the control data packets allow an immediate analysis of the control data packets at the receiving station, e.g. using hardware, an initial analysis of parts of specific control data packets is not required. Thus, if the transmission is carried out according to a layered communication model, the receiving station B; M1–Mn may analyze the. control data packets S1; S21–S24; S3 using a decoder, without having to wait for an input from a higher layer of the communication model, thereby enabling a particularly efficient data transmission.

In case of the OSI-reference model it is thus not required, to wait for an answer of the MAC layer upon reception of control data packets.

In the following, an embodiment for the transmission of control data packets in transmission frames will be described with respect to FIG. 3.

Figure 3:
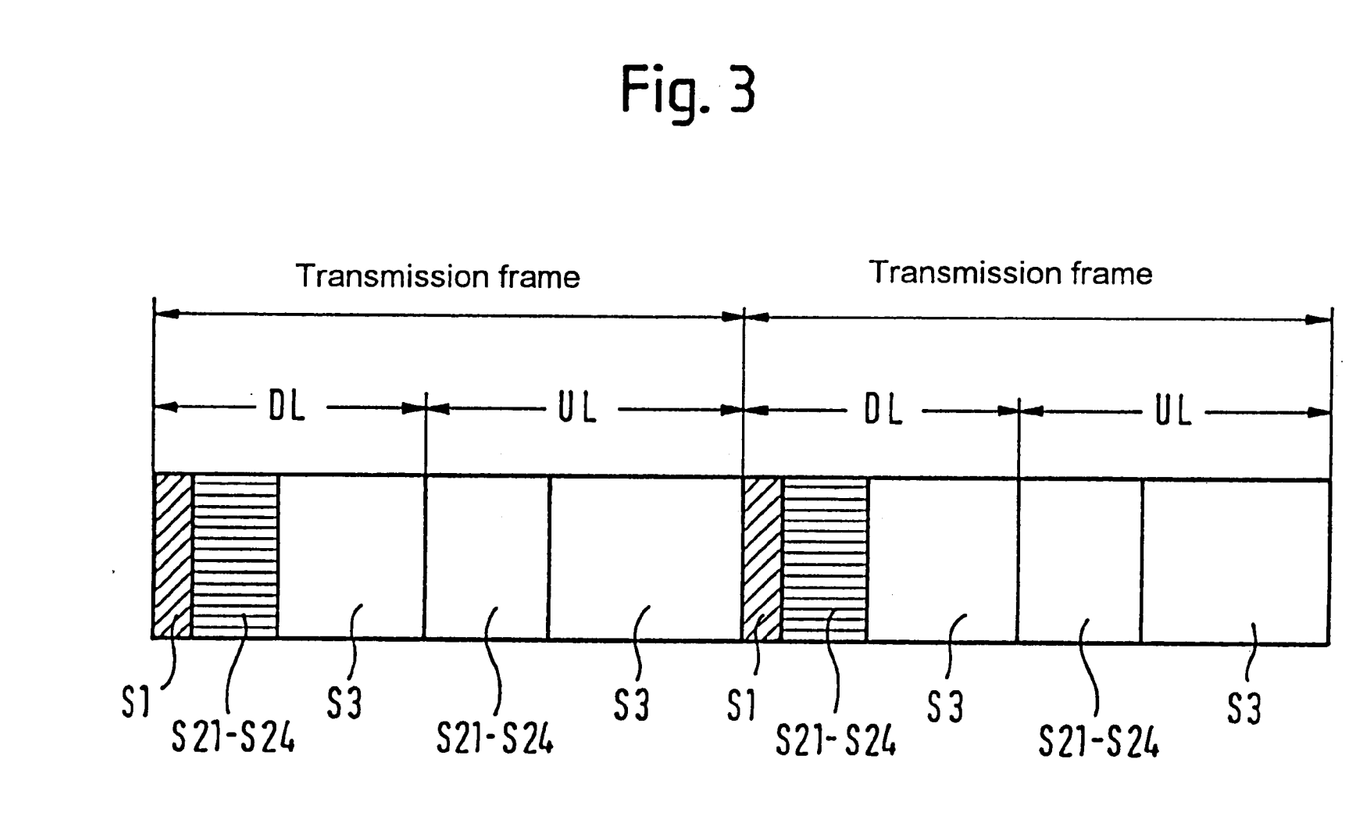
FIG. 3 schematically illustrates an embodiment of the allocation of time slots of two transmission frames to control data packets.

In FIG. 3 two transmission frames are illustrated, each being partitioned into a plurality of time slots. Further, the transmission frames are divided into downlink regions DL and uplink regions UL, wherein data are transmitted from the base station B to the mobile stations M1–Mn and from the mobile stations to the base station, respectively. FIG. 3 illustrates an embodiment for a transmission of control data packets within the transmission frames. At the beginning of one transmission frame it is necessary to transmit a control data packet of the first type S1, for defining the basic structuring of the respective transmission frame into time slots, uplink regions UL and downlink regions DL. The control data packets of the first type S1 are followed by an arbitrary number of control data packets of the second type S21–S24 in a downlink region DL, followed by an arbitrary number of control data packets of the third type S3.

It is not necessary to transmit a further control data packet of the first type within the uplink region UL following the downlink region DL, since the structure of the transmission frame has already been determined by the initial transmission of the control data packet of the first type S1. Instead, immediately arbitrary sequences of control data packets of the second and third type may be transmitted. A sequence of control data packets of the second type. S21–S24, followed by a number of control data packets of the third type S3 is illustrated.

It is preferred that control data packets of the third type S3 have a length, which is an integer multiple of the length of control data packets of the second type S21–S24, for enabling an efficient data transmission.

In the following transmission frame on the right side of FIG. 3 the basically same structure is repeated, however, arbitrary sequences of control data packets may be transmitted, except at the beginning of the transmission frame, where a control data packet of the first type S1 has to be transmitted.

For each of the link regions DL; UL a sequence of control data packets is shown, as it is suitably transmitted for a single mobile station. In further embodiments, however, sequences of control data packets for a plurality of mobile telephones may be transmitted within each of the link regions DL; UL either in blocks of control data packets associated with a connection or channel or in an interleaved fashion.

In the following, a further embodiment for the transmission of control data packets in a transmission frame will be described with respect to FIG. 4.

A control data packet of the first type, transmitted at the beginning of the transmission frame, defines the structure of the transmission frame. This includes an uplink region DL and a downlink region UL.

Figure 4:
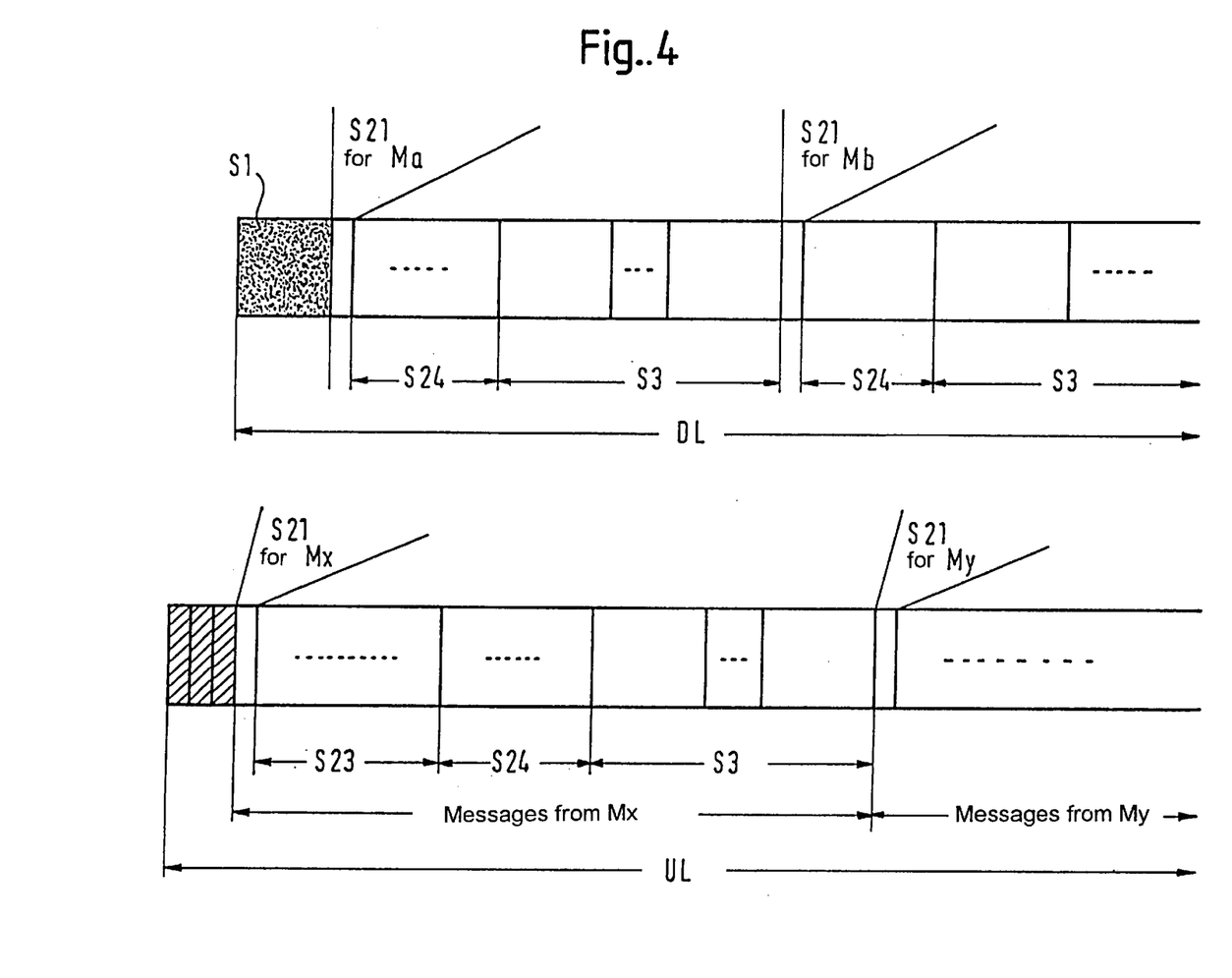
FIG. 4 shows a further embodiment for a transmission frame and the allocation of the time slots to control data packets.

In FIG. 4, a transmission period at the beginning of the transmission frame is hatched gray, and within this period, a control data packet of the first type S1 is transmitted, defining the structure of the transmission frame. The following time slots of the downlink region are reserved for a transmission from the base station B to one of the mobile stations M1–Mn. These reserved time slots may be used for a transmission of control information between the base station B and the operable mobile stations. The time slots of the uplink transmission region following the downlink transmission region are reserved for a transmission from the operable mobile stations to the base station.

Arbitrary random access time slots (not shown) may be provided, which are not reserved for a transmission between the base station and one of the operable mobile stations. Within these random access time slots the mobile stations may transmit data as needed, thus they may compete for a data transmission to the base station.

At the beginning of the uplink transmission region, several time slots are illustrated hatched. These time slots may be provided as random access time slots, wherein the mobile stations may transmit information as needed, thus they may compete for a transmission. For example, one of the mobile stations may transmit a communication request or similar to the base station. An arbitrary number of random access time slots may be provided, with arbitrary positions within the transmission frame.

In the following downlink transmission region, within a first reserved time slot, a header control data packet S21, as it war, for example, described with respect to FIG. 2b, is transmitted for a mobile station Ma. This mobile station Ma may be an arbitrary mobile station connected to the base station. In the following time slots error control data packets S24 are transmitted to the mobile station Ma for an error control. Following a sequence of control data packets of the third type S3 are transmitted to the mobile station Ma.

An arbitrary number or sequence of control data packets may be transmitted. Advantageously, however, within a leading header control data packet S21 for the mobile station Ma, a following sequence of control data packets of the second type S22–S24 and control data packets of the third type S3 is defined. This allows a very efficient transmission of data. Moreover, with the control data packets a very accurate assignment of channel capacity for respective connections or channels may be performed.

In a further sequence of time slots, beginning with a reserved time slot, a header control data packet S21 is transmitted for a mobile station Mb, which may be an arbitrary one of the mobile stations M1–Mn. Advantageously, it is again defined, which sequence of control data packets is transmitted to the mobile station Mb. In the shown embodiment a sequence of error control data packets S24 is transmitted. In the following, a sequence of control data packets of the third type S3 is transmitted. Here also arbitrary sequences of control data packets may be transmitted.

Subsequently, time slots could be reserved for further mobile stations, however, in the present example only two mobile stations are assumed to be present.

The downlink transmission region DL is followed by the uplink transmission region UL for a transmission from the mobile stations M1–Mn to the base station B. The time slots are reserved for specific mobile stations. Initially, in a first time slot, a header control data packet S21 is transmitted from a mobile station Mx, which may be an arbitrary of the operable mobile stations M1–Mn, to the base station B. A sequence of reservation control data packets S23 follows, for controlling establishing a connection or maintaining a connection. Following a sequence of error control data packets S24 is transmitted, for carrying out an error control. Subsequently, a sequence of control data packets S3 is transmitted, containing payload information.

The messages from the mobile station Mx are followed by a transmission of control data packets from the mobile stations My, which also may be an arbitrary one of the operable mobile stations M1–Mn connected to the base station B, in an analogous fashion.

As already outlined above, the assignment of time slots for a transmission of control data packets concerning a particular communication link or channel may preferably be carried out dynamically, according to capacity requirement. Further, the assignment of time slots for control data packets of the second type S21–S24 may be carried out preferred, before assigning time slots for control data packets of the third type S3.

Figure 5:
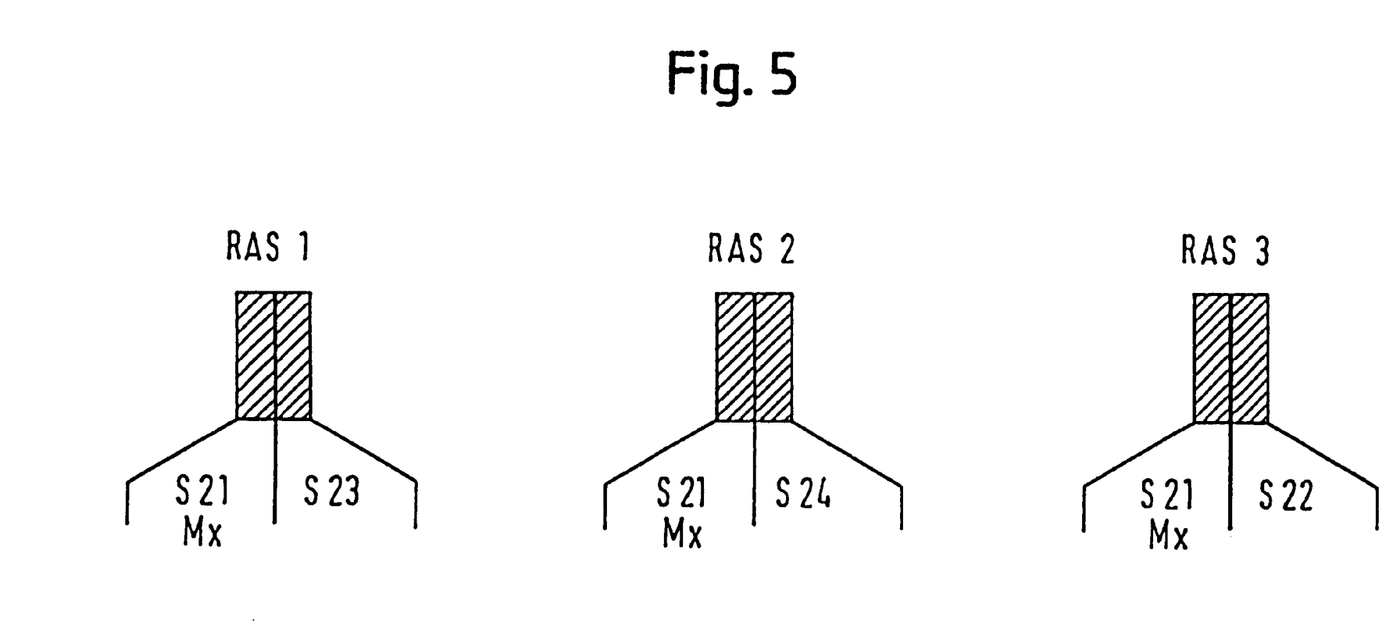
FIG. 5 illustrates an embodiment of the allocation of random access time slots.

In the following, with respect to FIG. 5, an embodiment of reserved time slots is described. FIG. 5 shows three sequences of each two reserved time slots, called random access time slots. All mobile stations M1–Mn connected to the base station may compete for a transmission of data within these time slots. In FIG. 5 examples for a transmission of control data packets are shown, as they have been described with respect to FIG. 2.

The pair of random access time slots left in FIG. 5 contains a sequence of a header control data packet S21 containing a sequence signal and a reservation control data packet S23, as outlined with respect to FIG. 2b, concerning a mobile station Mx. Thus, messages for maintaining a requirement-oriented communication of group 2) and group 4) may be contained.

In the embodiment in the middle, a pair of random access time slots with a sequence of a header control data packet S21 and an error control data packet S24 for mobile station Mx is shown. This sequence of control data packets thus may, e.g., contain messages for carrying out a requirement-oriented communication of group 2) and 5), for transmitting sequence information or error control signals.

The pair of random access time slots on the right of FIG. 5 shows a sequence of a header control data packet S21 and a communication control data packet S22. Thus, the messages of group 2) and 3) for establishing a communication or maintaining a communication may be transmitted.

The transmission of a header control data packet S21 at the beginning of a sequence of control data packets indicated therein allows an increase of efficiency of a data transmission, since the contained messages are transmitted only once.

What is claimed is:

1. A communication system for transmitting a plurality of payload data packets, comprising:

a base station;

a plurality of operable mobile stations;

communication links having variable transmission capacity for establishing virtual connections between the base station and the plurality of operable mobile stations, wherein each of the communication links occupies time slots of a radio channel for a data transmission;

control data packets of a first type, each of which being transmitted from the base station via each of the virtual connections to each of the plurality of mobile stations and containing at least information on a partitioning of the radio channel into time slots;

control data packets of a second type, each of which being transmitted via one of the virtual connections for controlling the virtual connection;

control data packets of a third type, each of which being transmitted via one of the virtual connections and containing at least one payload data packet; and forward error control signals transmitted in association with at least one of the control data packets, with a forward error control signal for a control data packet of the first type exhibiting a redundancy that is equal to or greater than a redundancy of a forward error control signal for a control data packet of the second type, and a forward error control signal for a control data packet of the second type exhibiting a redundancy that is equal to or greater than a redundancy of a forward error control signal for a control data packet of the third type.

2. The system of claim 1, wherein a control data packet of the third type includes identification signals for a virtual connection.

3. The system of claim 1, wherein at least one of the virtual connections is divided into a plurality of channels, and the control data packets of the second type control the virtual channels.

4. The system of claim 3, wherein a control data packet of the third type includes identification signals for virtual channels.

5. The system of claim 1, wherein a control data packet of the first type includes a signal for identifying the base station.

6. The system of claim 1, wherein a length of a control data packet of the third type is an integer multiple of a length of a control data packet of the second type.

7. The system of claim 1, wherein at least one of a control data packet of the first type and a control data packet of the second type contains identification signals for the base station.

8. The system of claim 1, wherein a control data packet of the third type contains a sequence number signal for characterizing a chronological order of payload data packets.

9. The system of claim 1, wherein a data transmission is in correspondence with a layered communication model, and the base and the mobile stations include a decoder for directly analyzing the control data packets without having to wait for an input from a higher layer of the layered communication model.

10. The system of claim, 1, wherein the data transmission is performed in correspondence with an OSI-reference model.

11. The system of claim 1, wherein the control data packets of the first, second and third type contain Medium Access Control (MAC) protocol data.

12. The system of claim 1, wherein the data transmission is carried out using Asynchronous Transfer Mode (ATM).

13. The system of claim 1, wherein a control data packet of the first type defines the Medium Access Control (MAC) time slot frame structure of the radio channel.

14. The system of claim 1, wherein a control data packet of the second type includes Medium Access Control (MAC) data for controlling a virtual connection.

15. The system of claim 1, wherein a control data packet of the second type is a header control data packet which includes at least a time slot allocation signal for indicating an allocation of time slots for the transmission of control data packets via the virtual connection.

16. The system of claim 1, wherein a control data packet of the second type is a connection control data packet which includes signals for at least one of establishing and maintaining a communication.

17. The system of claim 1, wherein a control data packet of the second type is a reservation control data packet which includes at least messages relating to a number of time slots to be reserved for the virtual connection.

18. The system of claim 1, wherein a control data packet of the second type is an error control data packet which includes an error control signal used for indicating at least one of a correctness and an incorrectness of control data packets transmitted via the virtual connection.

19. The system of claim 1, wherein in correspondence to a load of the system, a transmission capacity is allocated for control data packets of the second type, said capacity being greater than four control data packets of the third type.

20. A communication system for transmitting a plurality of payload data packets, comprising:

a base station;

a plurality of operable mobile stations;

communication links having a variable transmission capacity, each divided into a plurality of virtual channels, each of said links establishing a virtual connection between the base station and one of the plurality of mobile stations wherein the communication links occupy time slots of a radio channel for a data transmission;

control data packets of a first type, each of which being transmitted from the base station via each of the virtual connections to the mobile stations and containing at least information on a partitioning of the radio channel into time slots;

control data packets of a second type, each of which being transmitted via one of the virtual connections for controlling the virtual channels;

control data packets of a third type, each of which being transmitted via one of the virtual connections and containing at least one payload data packet; and forward error control signals are transmitted in association with at least one of the control data packets, with a forward error control signal for a control data packet of the first type exhibiting a redundancy equal to or larger than the redundancy of a forward error control signal for a control data packet of the second type, and a forward error control signal for a control data packet of the second type exhibiting a redundancy equal to or larger than a redundancy of a forward error control signal for a control data packet of the third type.

21. The system of claim 20, wherein a control data packet of the second type is a header control data packet which includes at least a time slot allocation signal for indicating an allocation of time slots for the transmission of control data packets via the virtual connection.

22. The system of claim 20, wherein a control data packet of the second type is a connection control data packet which includes signals for at least one of establishing and maintaining a communication.

23. The system of claim 20, wherein a control data packet of the second type is a reservation control data packet which includes at least messages relating to a number of time slots to be reserved for the virtual connection.

24. The system of claim 20, wherein a control data packet of the second type is an error control data packet which includes an error control signal used for indicating at least one of a correctness and an incorrectness of control data packets transmitted via the virtual connection.

25. The system of claim 20, wherein a control data packet of the third type includes identification signals for virtual channels corresponding to a virtual connection.

26. The system of claim 20, wherein at least one of a control data of the first type and a control data packet of the second type contains identification signals for virtual channels corresponding to a virtual connection.

27. The system of claim 20, wherein a data transmission is in correspondence with a layered communication model, and the base and the mobile stations include a decoder for directly analyzing the control data packets without having to wait for an input from a higher layer of the communication model.

28. The system of claim 20, wherein a control data packet of the second type includes Medium Access Control (MAC) data for controlling a virtual channel corresponding to a virtual connection.

* * * * *